(12) United States Patent
Wilkins et al.

(10) Patent No.: US 10,406,613 B2
(45) Date of Patent: Sep. 10, 2019

(54) LUMBER EDGER AND METHOD OF EDGE CUTTING LUMBER

(71) Applicant: Baxley Equipment Co., Hot Springs, AR (US)

(72) Inventors: Bill Wilkins, Hood River, OR (US); Chris Raybon, Hot Springs, AR (US); Russell R. Kennedy, Hot Springs, AR (US); Pat Conry, Hot Springs, AR (US)

(73) Assignee: BAXLEY EQUIPMENT CO., Hot Springs, AR (US)

( * ) Notice: Subject to any disclaimer, the term of this patent is extended or adjusted under 35 U.S.C. 154(b) by 1057 days.

(21) Appl. No.: 13/860,727

(22) Filed: Apr. 11, 2013

(65) Prior Publication Data

US 2013/0269836 A1 Oct. 17, 2013

Related U.S. Application Data

(60) Provisional application No. 61/624,151, filed on Apr. 13, 2012.

(51) Int. Cl.
| | |
|---|---|
| *B27B 31/06* | (2006.01) |
| *B23D 47/04* | (2006.01) |
| *B27B 5/04* | (2006.01) |
| *B27B 5/22* | (2006.01) |

(52) U.S. Cl.
CPC ............... *B23D 47/04* (2013.01); *B27B 5/04* (2013.01); *B27B 5/228* (2013.01); *B27B 31/06* (2013.01); *Y10T 29/49716* (2015.01)

(58) Field of Classification Search
CPC .......... B27B 1/00; B27B 1/002; B27B 1/005; B27B 1/007; B27G 23/00; B27M 1/08; G05B 2219/35162; G05B 2219/35188
USPC ......................................................... 700/171
See application file for complete search history.

(56) References Cited

U.S. PATENT DOCUMENTS

| | | | | |
|---|---|---|---|---|
| 4,245,913 | A * | 1/1981 | Sarlos ................. | G01B 11/303 250/559.46 |
| 4,462,443 | A | 7/1984 | Allen | |
| 4,676,130 | A | 6/1987 | Nutt | |
| 4,803,371 | A | 2/1989 | Durland | |
| 5,765,617 | A * | 6/1998 | Mierau .................. | B27B 31/06 144/242.1 |
| 5,960,104 | A * | 9/1999 | Conners ............. | G01N 21/8986 144/402 |
| 6,308,756 | B1 | 10/2001 | Anttilla | |
| 6,817,392 | B2 * | 11/2004 | Phillips .................... | B27C 5/04 144/1.1 |
| 9,314,937 | B2 | 4/2016 | Saastomo | |
| 2008/0257451 | A1 * | 10/2008 | Borne .................... | B27B 1/007 144/1.1 |

(Continued)

OTHER PUBLICATIONS

Office Action dated Dec. 19, 2014 in U.S. Appl. No. 13/928,167 (now issued as U.S. Pat. No. 9,314,937) and Response filed on Jun. 19, 2015, pp. 1-19.

*Primary Examiner* — Matthew Katcoff
(74) *Attorney, Agent, or Firm* — Jeffrey S. Melcher; Melcher Patent Law PLLC

(57) ABSTRACT

Provided is an improved lumber edger having a cross cut saw to cross cut lumber into two or more separate pieces to increase the available amount or value of boards, and a method of using the improved lumber edger.

7 Claims, 10 Drawing Sheets

(56) References Cited

U.S. PATENT DOCUMENTS

2010/0161096 A1* 6/2010 Giudiceandrea .......... B27B 1/00
                                                                              700/98

\* cited by examiner

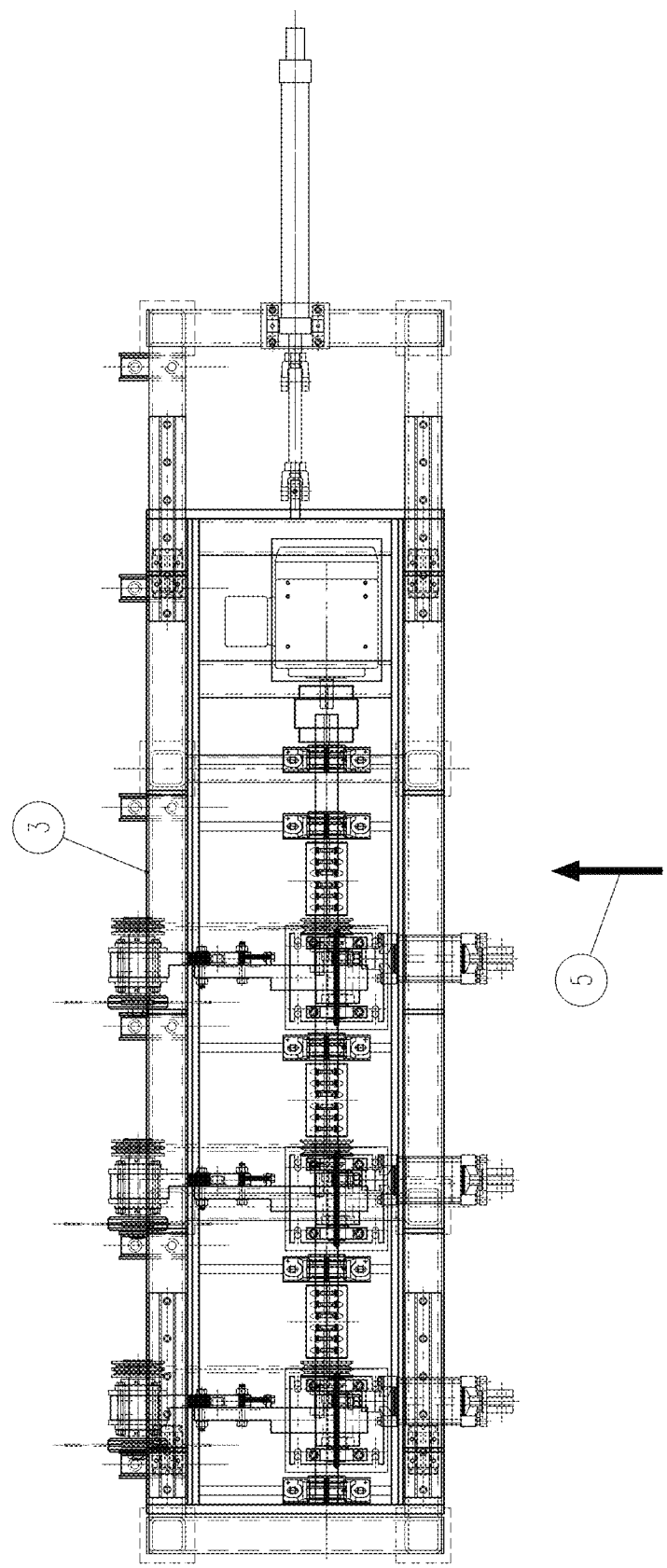

LUMBER EDGER AND METHOD OF EDGE CUTTING LUMBER

This application claims priority to U.S. Provisional Patent Application Ser. No. 61/624,151, filed Apr. 13, 2012, the complete disclosure of which is incorporated herein by reference.

FIELD OF THE INVENTION

The invention relates to an improved lumber edger having a cross cutter to cross cut lumber into two or more separate lumber pieces to increase the available amount of board produced, and a method of using the improved lumber edger.

BACKGROUND OF THE INVENTION

Lumber edgers saw off the rough side edges of freshly sawn lumber (planks), called flitches, to produce 4 sided boards using edger saws. The edger saws are parallel to each other and typically about 4", 6", 8", 10" or 12" apart. The flitch is scanned prior to cutting to determine what the widest and longest single board or set of side by side boards that can be manufactured, then laterally positions and skews the flitch to suit that cut solution and releases it to be conveyed linearly through the edger saws.

Lumber edgers can be categorized as gang or shifting edgers. In gang edgers the edger saws remain stationary. In a shifting edger the edger saws can move left or right independently of one another. This allows setting the saws to best maximize the product that can be produced from a particular position of the lumber. In this usage, position means the side to side translation of the board relative to a pair or bank of saws such that as the board is propelled through the saws a particular path is sawn. Additionally, position includes the rotation of the board or skew relative to the same pair or bank of saws. Combined the translation and skew forms the position.

Modern lumber edgers usually include a lumber sensor that measures the dimensions of the lumber (flitch). The lumber is then positioned in relation to the edger saws to maximize the amount of board that can be produced by cutting the edges. Even by positioning the lumber to maximize the amount of board, there remains a large amount of waste lumber. Thus, there is a need for an improved system and method to reduce the waste lumber and increase the amount of produced board.

SUMMARY OF THE INVENTION

An objective of the invention is to provide an improved lumber edger that can be used to maximize the amount of board produced by cross cutting the flitch.

This objective and other objectives are obtained by a lumber edger comprising:
 a conveyor for conveying lumber;
 a scanner for scanning dimensions of the lumber;
 a computer in communication with the scanner;
 a cross cut saw constructed to cross cut the lumber downstream of the scanner;
 edger saws constructed to edge the lumber; and
 a positioning system to position the lumber in relation to the edger saws, wherein the computer system is constructed to calculate at least one theoretical cross cut position of the lumber and calculate theoretical edge positions for each piece of lumber separated by the theoretical cross cut position.

This objective and other objectives are further met by a method of edge cutting lumber comprising:
 conveying a piece of lumber on a conveyor;
 scanning dimensions of the lumber using a scanner and sending the dimensions to a computer system;
 using the computer system to determine at least one theoretical cross-cut position on the lumber and theoretical edge cut positions on the lumber, wherein the theoretical edge cut positions are calculated for each piece of lumber separated by the theoretical edge cut position;
 cross cutting the lumber at the at least one theoretical cross-cut position using at least one cross-cut saw downstream of the scanner to provide at least two pieces of lumber;
 positioning the pieces of lumber in relation to edger saws so that the edge saws cut the pieces of lumber at the theoretical cross cut positions; and
 cutting the lumber using the edger saws at the theoretical edge cut positions to provide boards.

The above objectives and other objectives are further obtained by a method of improving a lumber edger comprising:
 a conveyor for conveying lumber;
 a scanner for scanning dimensions of the lumber;
 a computer in communication with the scanner;
 edger saws constructed to edge the lumber; and
 a positioning system to position the lumber in relation to the edger saws, the method comprising:
 adding a cross cut saw constructed to cross cut the lumber downstream of the scanner; and
 modifying the computer system to calculate at least one theoretical cross cut position of the lumber and calculate theoretical edge positions for each piece of lumber separated by the theoretical cross cut position.

BRIEF DESCRIPTION OF THE DRAWINGS

FIGS. 6A and 6B show the cross cut saw.

DETAILED DESCRIPTION OF THE INVENTION

The invention will be explained with reference to the attached non-limiting drawings.

Figure 1:
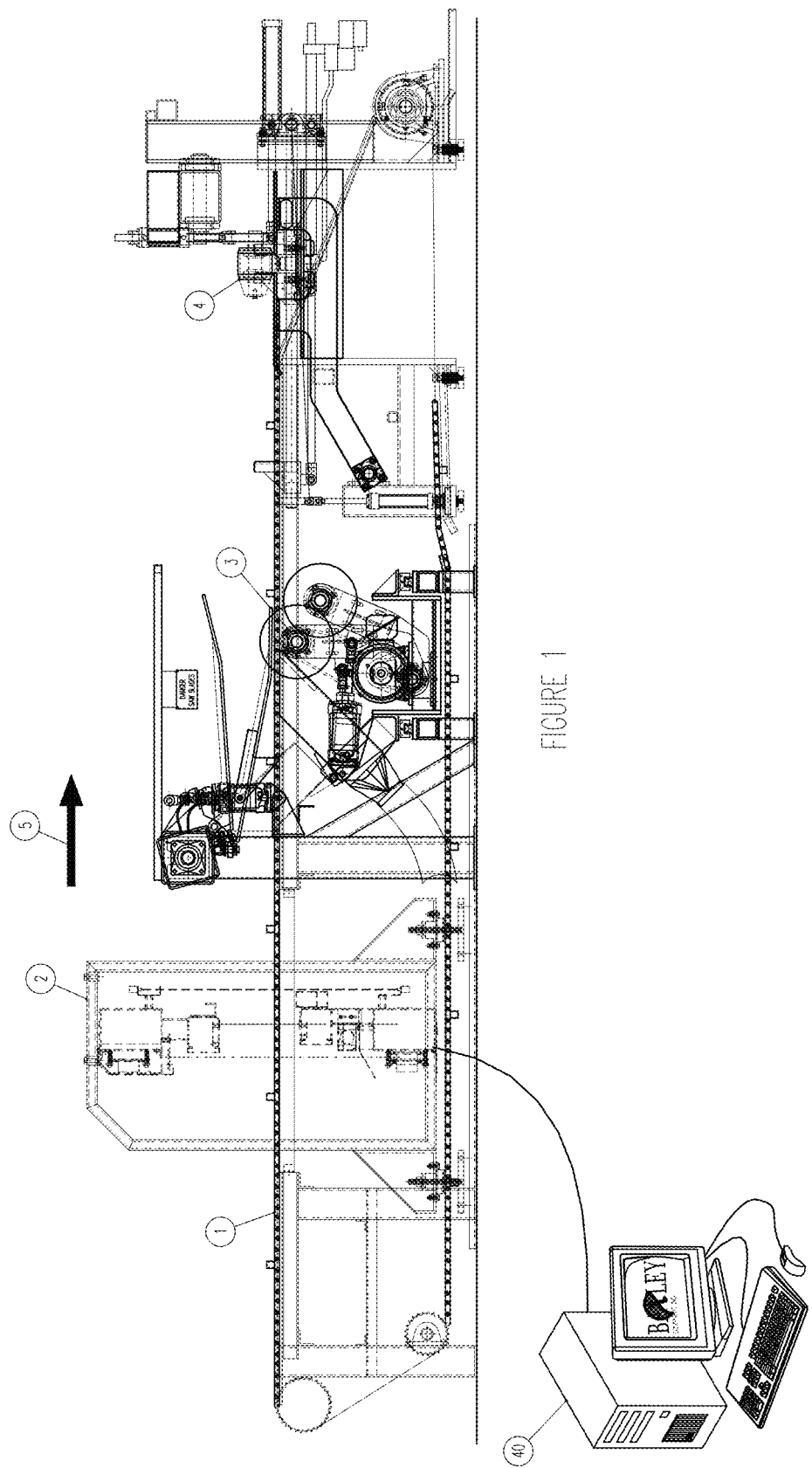
FIG. 1 shows an elevation view of the described Edger Cross Cut System.
Figure 2:
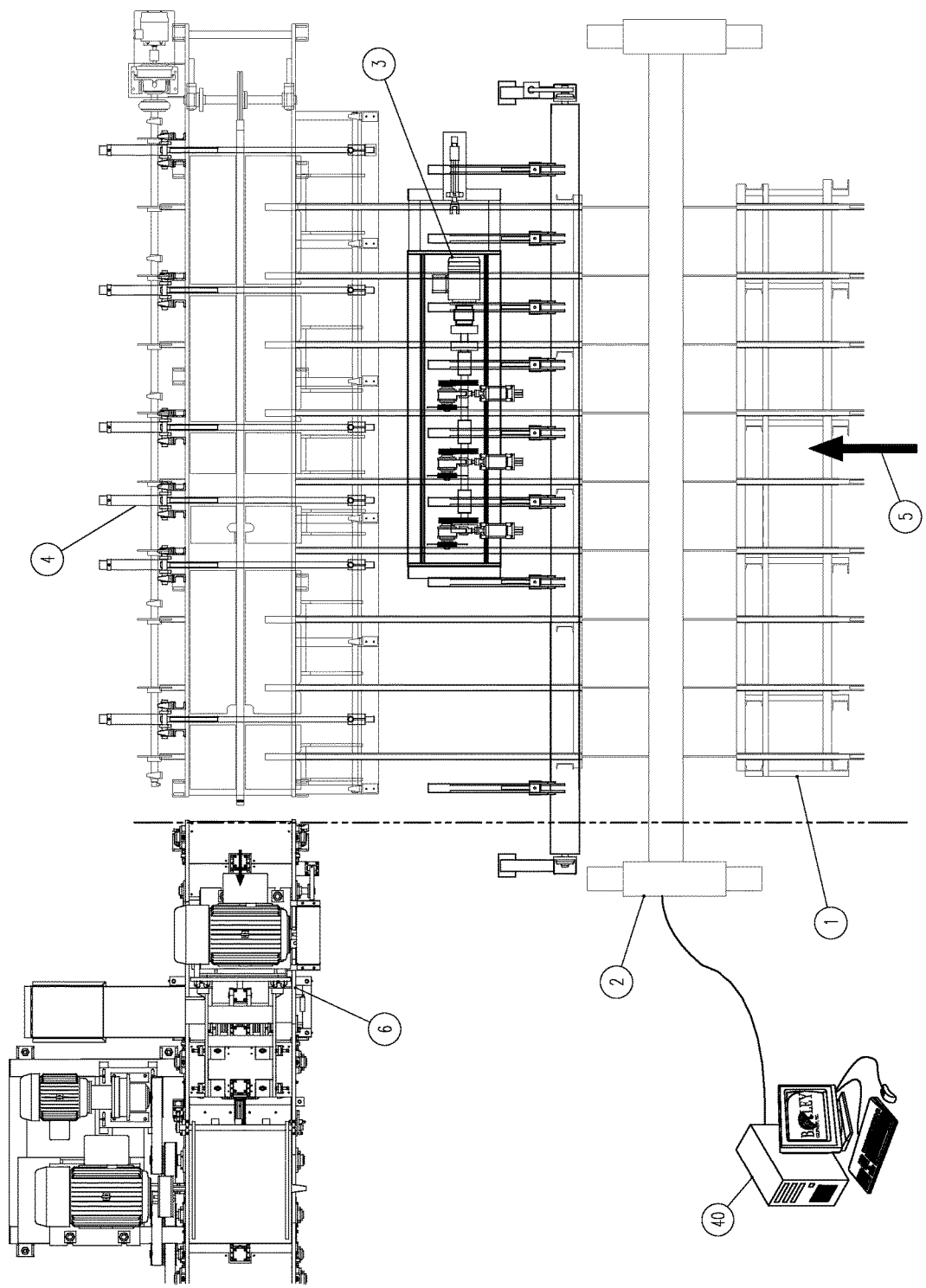
FIG. 2 shows the plan view of the cross cut edger system with the same elements as FIG. 1.

FIGS. 1 and 2 show an elevation view of an improved edger cross cut system having a conveyor 1 for conveying the lumber (flitch) which comprises of a plurality of lugged chains. The system includes a scanner 2 for scanning dimensions of the lumber, which can comprise laser range finders that measure the differential thickness of the board as it passes through. The scanner 2 is connected to a computer system 40, which calculates at least one theoretical cross cut position and theoretical edge positions. The cross cut separates the lumber into separate pieces. The edge positions for each separate lumber piece are calculated independently of each piece of lumber to increase the amount of cut lumber and reduce lumber waste compared to non-cross cut lumber. A computer system 40 constructed to calculate the theoretical edge position and to calculate the theoretical edges for each piece of lumber independently has not been known previously.

The system further includes a cross cut saw 3 constructed to cross cut the lumber downstream of the optimizer at the theoretical cross cut position, which can comprise at least one or more moveable saw blades located in either fixed or shifting positions. A single saw 3 is selected and moved into position to saw a cross cut in the lumber as it passes through.

The system additionally includes a positioning system 4 constructed to position the lumber in relation to the edger saws 6. The positioning system 4 can comprise a plurality of computer controlled moveable board positioning pins that slide on ways that tilt. The properly selected pins position both cross cut boards simultaneously in both the transverse direction and skewed direction relative to the edger saws 6. The individual boards are then conveyed through the edger saws sawing the desired boards. The lumber flows in direction 5.

Figure 3:
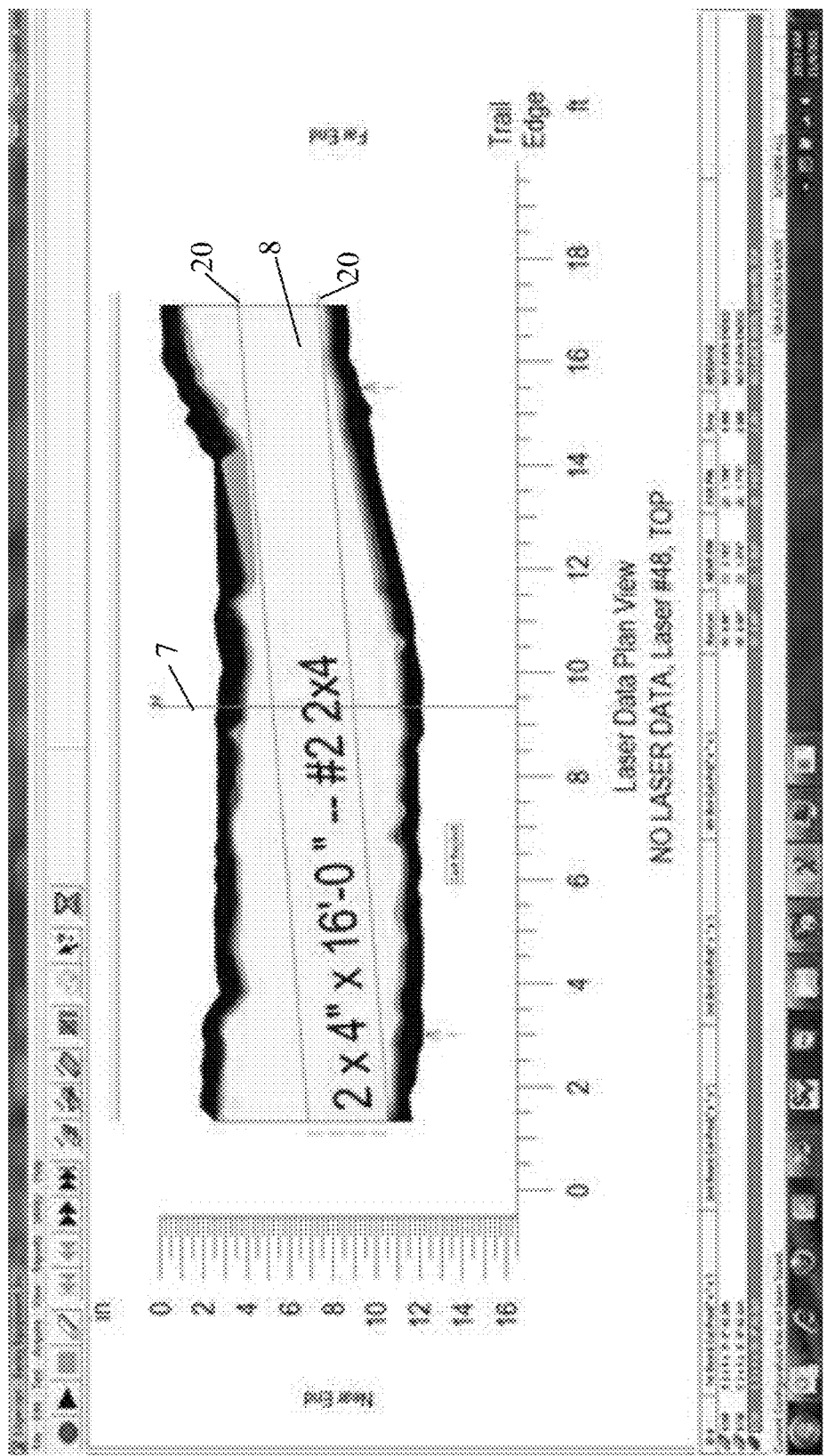
FIG. 3 shows a scanned plan view of a flitch having theoretical edge positions.

Lumber edger systems are now well known in the art. Examples of lumber edgers and scanning structures are disclosed in U.S. Pat. Nos. 6,308,756; 4,803,371; 4,676,130; and 4,462,443, the complete disclosures of which are incorporated herein by reference. Conventional lumber edger systems are capable of scanning the dimensions of a single piece of lumber and cutting the edges 20 of the piece of lumber as shown in FIG. 3. These conventional lumber edger systems can now be modified according to the present invention by incorporating a cross cut saw 3 and modified computer system 40 as described herein.

The non-edged lumber (also referred to as flitch) shown in FIG. 3 has a theoretical edge cuts 20 to provide board 8, which conventional edges are capable of cutting. However, FIG. 3 also shows the additional theoretical cross cut 7, which conventional lumber edger systems are not capable of calculating and cross-cutting.

Figure 4:
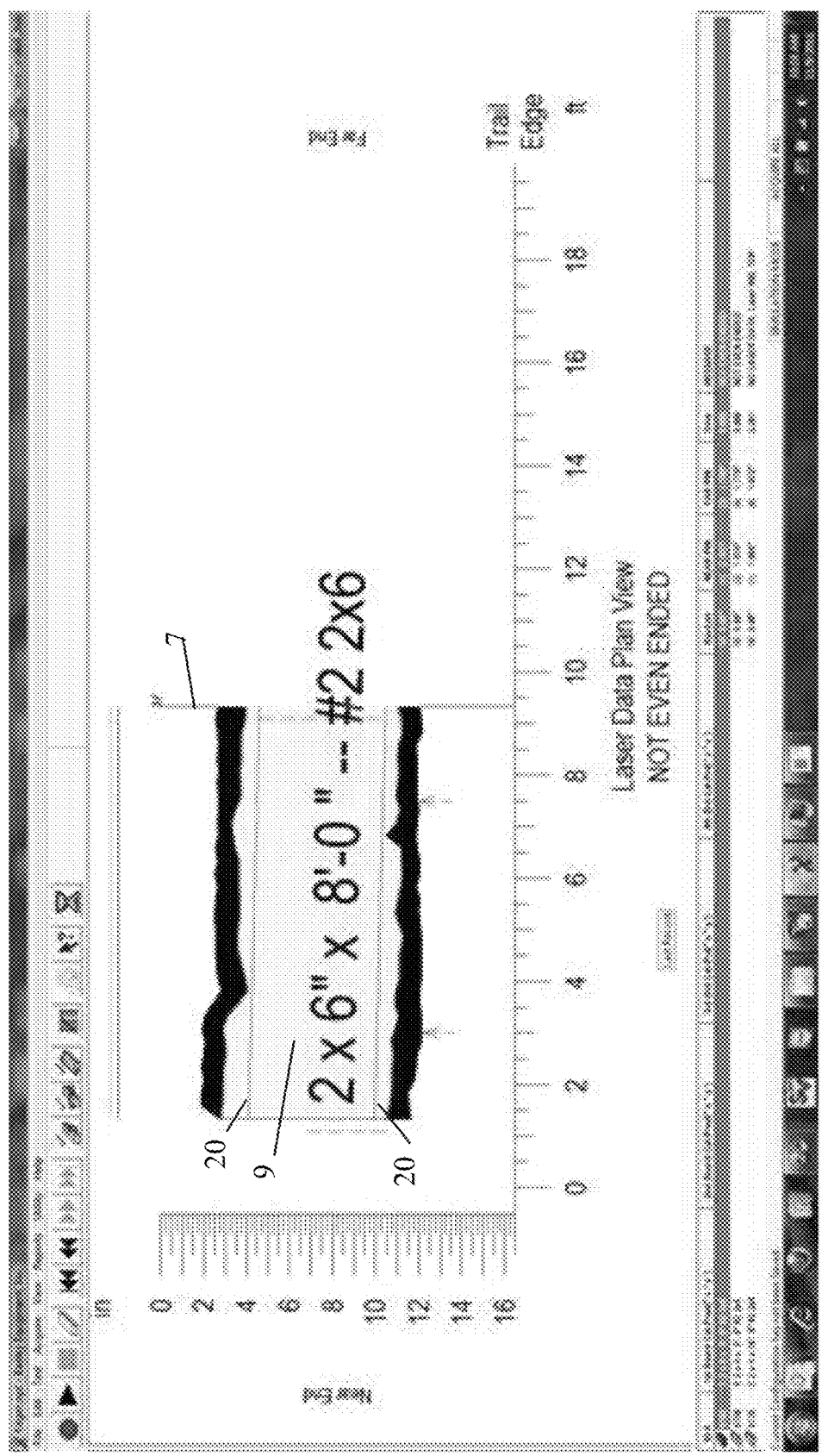
FIG. 4 shows the scanned plan view of one board of the cross cut solution having theoretical edge positions.
Figure 5:
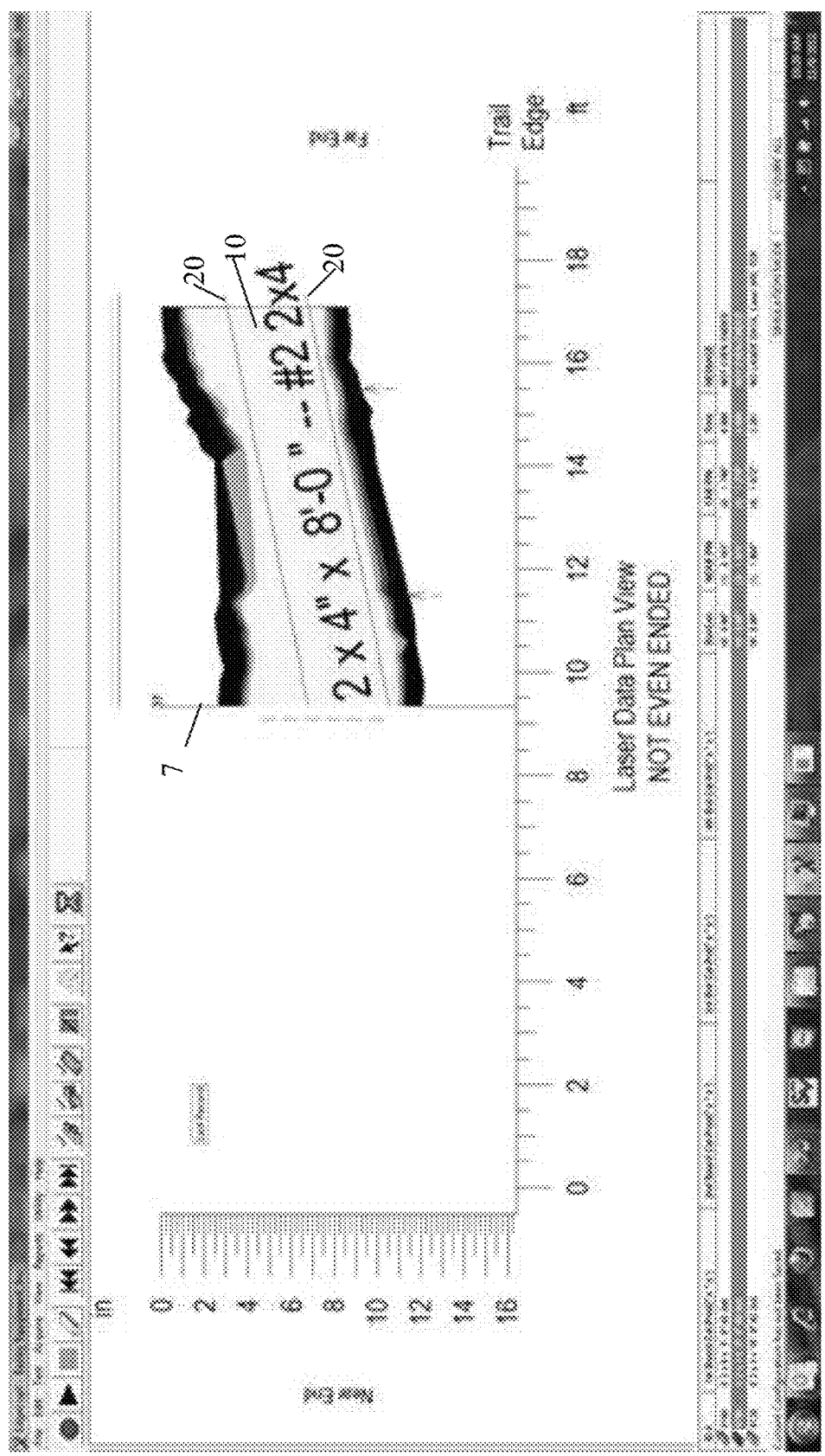
FIG. 5 shows the scanned plan view of one board of the cross cut solution having theoretical edge positions.

The improved edger system according to the present invention calculates a theoretical cross cut 7, shown in FIGS. 3-5, to optimize the size of the theoretical board 8 having theoretical edges 20. The theoretical edge cuts 20 are calculated by the computer system 40 for each theoretical piece of lumber so that the width of the board 8 can vary among the different cross cut pieces of lumber.

FIG. 3 shows a FIG. 3 shows a computer screen shot of a scanned plan view of a typical lumber (flitch). FIG. 3 shows the normal non-cross cut solution which is a 2×4× 16'-0" board 8 when cut at edges 20 and not cross-cut at 7. This board 8 yields 10.67 board feet of lumber. Thus, a conventional lumber edger would only be able to produce a board of the dimension shown in FIG. 3.

FIGS. 4 and 5 show the scanned plan view of the same flitch as FIG. 3, but with increased cross-cut solution according to the present invention, i.e. the board is cross-cut at 7 to provide two pieces of lumber shown at 9 and 10. FIG. 4 shows one board 9 of the cross cut solution which is 2×6×8'-0" when cut at edges 20. This board 9 yields 8.0 board feet of lumber. FIG. 5 shows the remaining board 10 of the cross cut solution which yields 2×4×8'-0" when cut at edges 20. This board 10 yields 5.33 board feet of lumber. The two cross cut lumber pieces of FIGS. 4 and 5 together yield 13.33 board feet of lumber. Compared to the non-cross cut result shown in FIG. 3, this is a 2.66 additional board feet of lumber. In this example, the cross-cut addition according to the present invention provided a 25% increase in board and 25% less lumber waste.

Figure 6A:
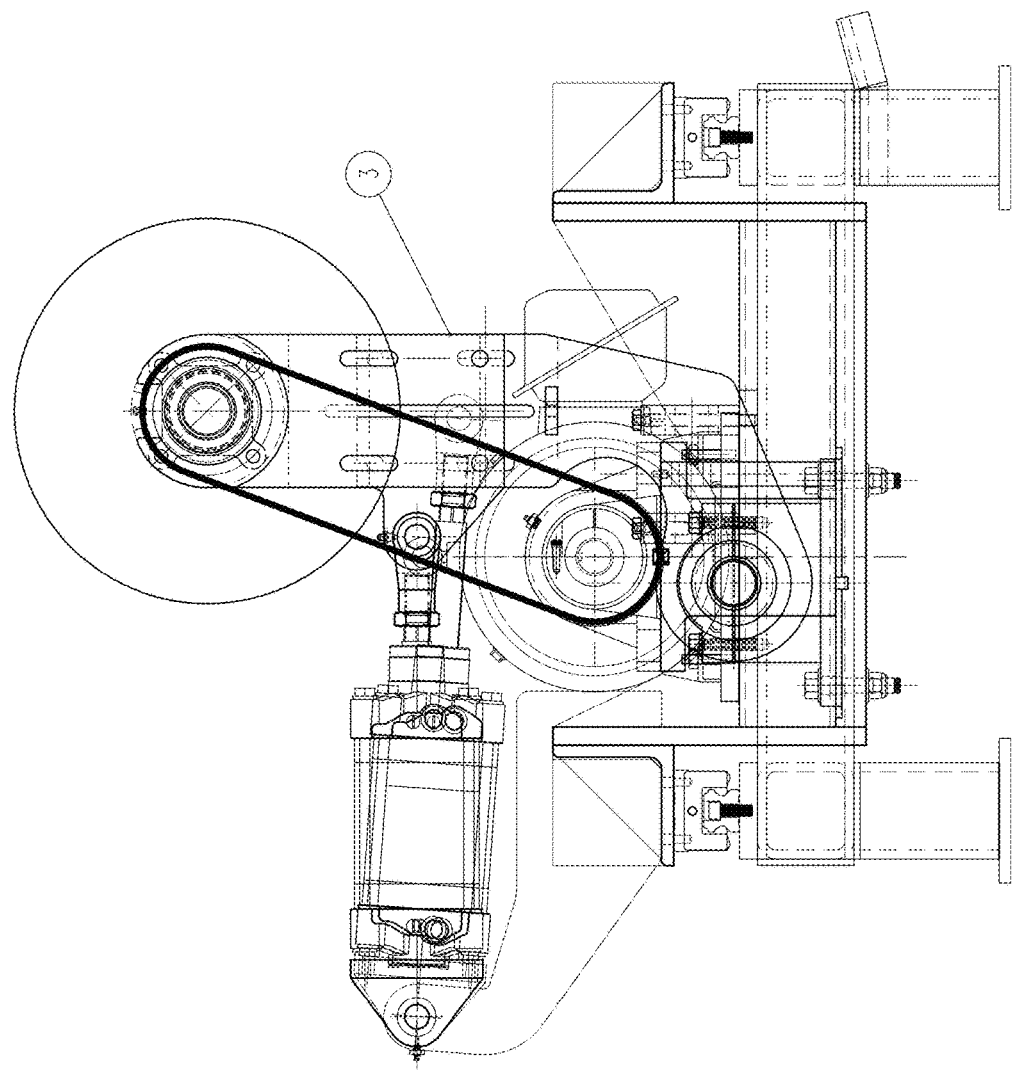

FIGS. 6A and 6B show the cross cut saw 3. This particular embodiment has three individual saws, individually actuated. More or less saws can be used to achieve the desired cuts. Additionally, this embodiment incorporated shifting saw positions to match the orientation of the board. This may not be desirable in each application.

Figure 7A:
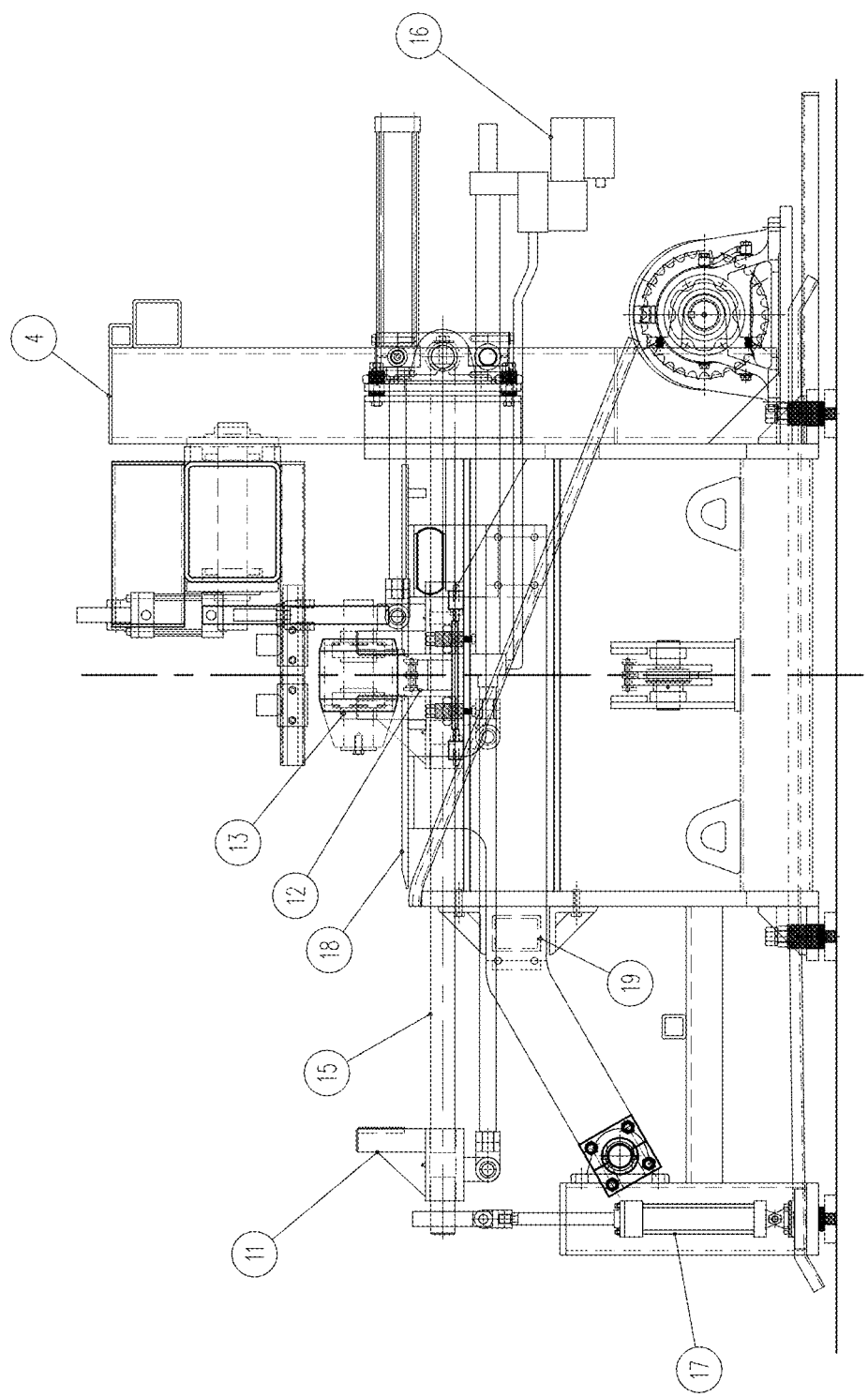
FIGS. 7A and 7B shows the board positioning system.
Figure 7B:
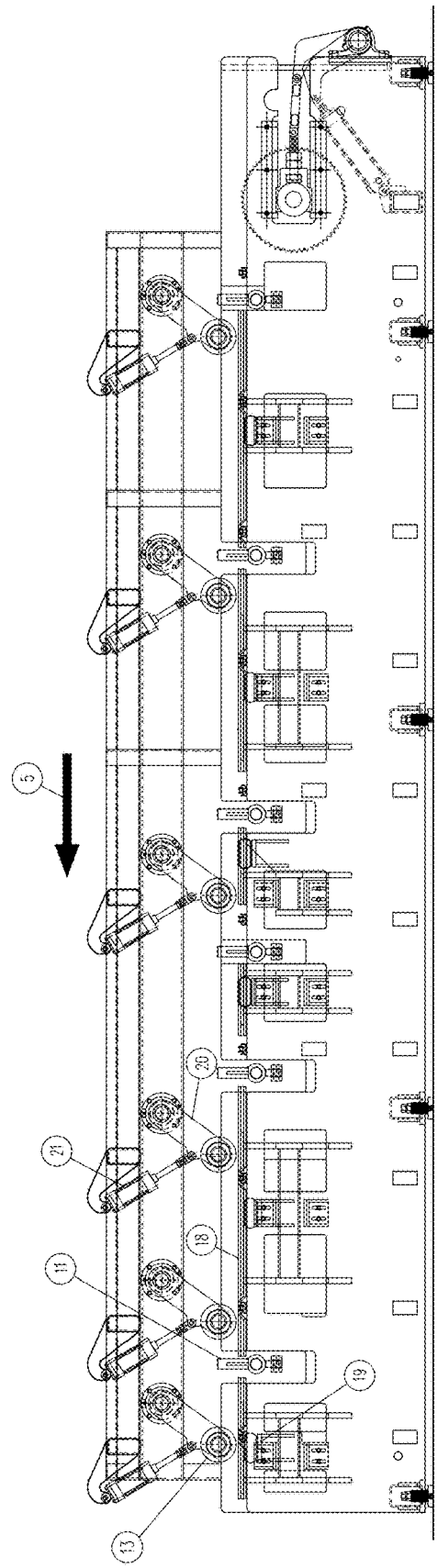

FIGS. 7A and 7B shows an example of a board positioning system. The positioning system includes positioning pins 11 to propel the flitch into position (translation and skew). Positioning pins 11 slide on a round way 15 moved by an actuator 16. The round way 15 is lowered by an actuator 17 to allow an incoming flitch to pass and raised to enable the positioning pin 11, to engage and pull the flitch into the desired position calculated by the computer system 40. Lumber parking ramps 18, raised by an actuator 19 allow the positioning pins 11 to pull the flitch across the conveyor feeding flitches through the saw 12. Once the flitch is in position the press rolls 13 are lowered by pivot arms 20 with actuators 21 stabilizing the flitch while the positioning pins 11 are retracted and parking ramps 18 are lowered releasing the flitch to be conveyed to the edger saws 6. The press rolls 13 push the flitch down so that the chain moves the flitch. The actuators can be controlled by the computer system 40.

Figure 8:
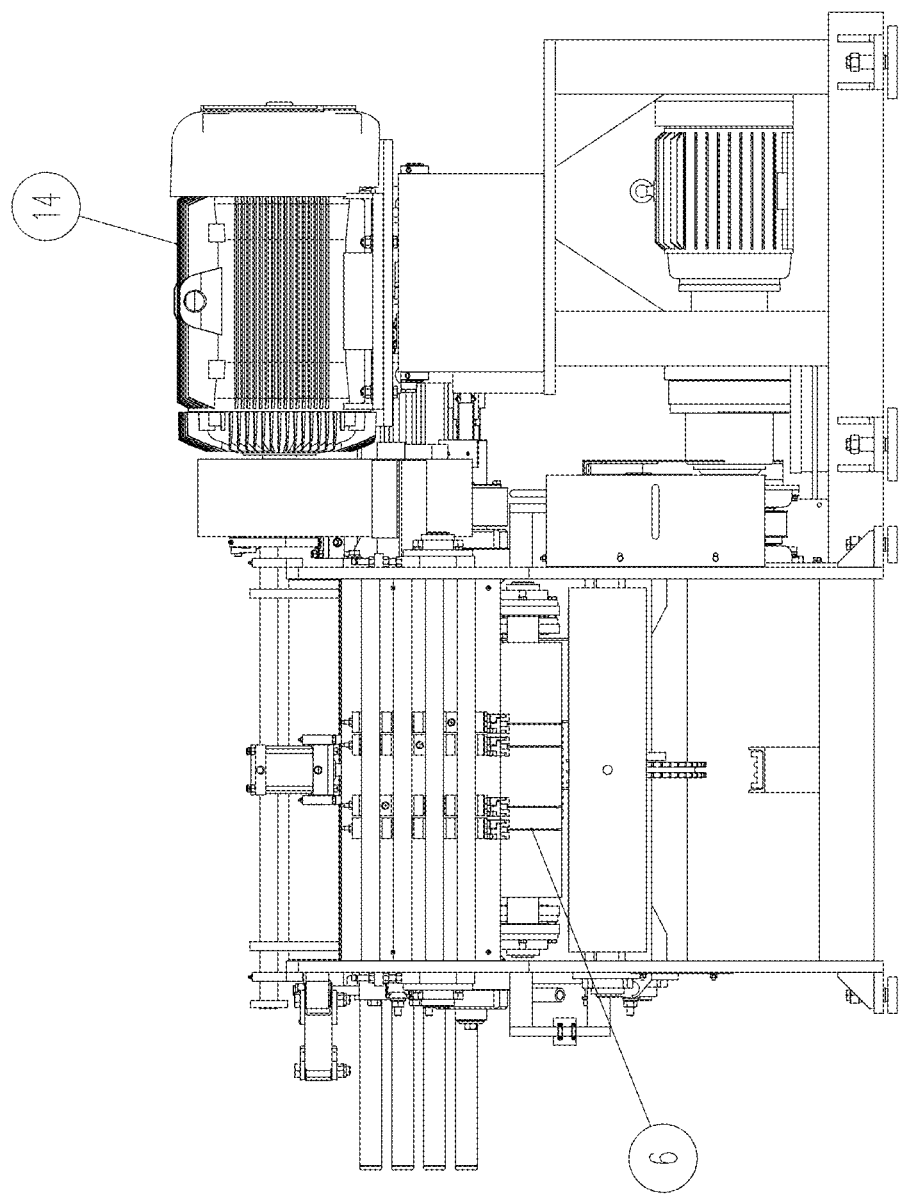
FIG. 8 shows the edger saws.

FIG. 8 shows the edger saws 6 driven by motor 14.

A preferred method is to pull each portion of the cross cut lumber into position simultaneously, independently laterally position, and skew, then release each piece of lumber separately in a timed interval if the edger saw set is different or together if it is the same. Another iteration is a preliminary scanner to decide the need for cross cutting, then cross cutting, then sending each lumber portion through a separate linear scanner and to a moveable edger saw section.

The cross cut saw according to the present invention can be incorporated into existing edgers. The present positioning systems and programming can be altered to account for the cross cut saw.

If desired, the cross cut saw can be constructed to be moveable closer and away from an index line of the lumber to cross cut at a predetermined optimal length. The index line is usually the end of the lumber.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

We claim:

1. A method of edge cutting a flitch comprising:
conveying a flitch on a conveyor;
scanning dimensions of the flitch using a scanner and sending the dimensions to a computer system;
using the computer system and the dimensions to determine at least one theoretical cross-cut position on the flitch and theoretical edge cut positions on the flitch, wherein the theoretical edge cut positions are calculated for each piece of the flitch separated by the theoretical edge cut position;

cross cutting the flitch at the at least one theoretical cross-cut position using at least one cross-cut saw downstream of the scanner to provide at least two pieces of flitch comprising a first piece of filtch and a second piece of filtch;

using a positioning system connected to the computer system to independently translate and skew each of the pieces of flitch in relation to an edger so that the edge saws cut each of the pieces of flitch at the theoretical edge cut positions, wherein the computer system directs the positioning system and the positioning system is constructed to independently translate and skew each of the pieces of flitch; and cutting the pieces of flitch using the edger saws at the theoretical edge cut positions to provide boards comprising a first board formed from the first piece of flitch and a second board formed from the second flitch, the first board having a first width and the second board having a second width, the first width being different from the second width.

2. The method according to claim 1, wherein the computer determines the theoretical cross-cut position and theoretical edge cut positions to provide the largest size of boards that can be cut from the flitch, taking into account that the flitch can be cross cut into smaller pieces of flitch.

3. The method according to claim 1, further comprising using the positioning system to simultaneously and independently translate and skew the pieces of flitch in relation to edger saws so that the edge saws cut the pieces of flitch at the theoretical edge cut positions.

4. A method of improving a flitch edger comprising:
a conveyor for conveying a flitch;
a scanner for scanning dimensions of the flitch;
a computer in communication with the scanner;
edger saws constructed to edge the flitch; and
a positioning system constructed to independently translate and skew each of pieces of cross-cut flitch in relation to the edger saws, the method comprising:
adding a cross cut saw constructed to cross cut the flitch downstream of the scanner; and
modifying the computer system to calculate at least one theoretical cross cut position of the flitch and calculate theoretical edge positions for each piece of flitch separated by the theoretical cross cut position so that at least two boards comprising a first board and a second can be produced from the flitch, wherein the first board has a different width from the second board.

5. In a method of edging flitch comprising:
conveying the flitch on a conveyor;
scanning dimensions of the flitch by a scanner and sending the dimensions to a computer system;
determining edge cut positions on the flitch by the computer system;
laterally positioning and skewing the flitch by a skew structure to position the flitch in relation to edger saws; and
edge cutting the flitch at the edge cut positions by the edger saws to form a board, wherein the improvement comprises:
determining by the computer system a cross-cut position on the flitch;
determining by the computer system first edge cut positions for a first piece of the flitch separated from a second piece of flitch by the cross cut position;
determining by the computer system second edge cut positions for the second piece of flitch;
cross cutting the flitch at the cross-cut position by a cross-cut saw to provide a first cross cut piece of flitch and a second cross cut piece of flitch;
laterally positioning and skewing the first cross cut piece of flitch by the skew structure to position the first cross cut piece of flitch in relation to the edger saws;
edge cutting the first cross cut piece of flitch at the first edge cut positions by the edger saws to provide a first board having a first width;
laterally positioning and skewing the second cross cut piece of flitch by the skew structure to position the second cross cut piece of flitch in relation to the edger saws; and
edge cutting the second cross cut piece of flitch at the second edge cut positions by the edger saws to provide a second board having a second width, wherein the first width is different from the second width.

6. The method according to claim 5, further comprising determining by the computer system a largest size of board that can be cut from the flitch, taking into account that the flitch can be cross cut into smaller pieces of flitch.

7. The method according to claim 5, further comprising determining by the computer at least one additional cross cut position on the flitch, determining by the computer system edge cut positions for each additional piece of flitch separated by the at least one additional cross cut position, cross cutting the flitch by the cross cut saw at the at least one additional cross cut position to provide at least one additional cross cut piece of flitch, and edge cutting the at least one additional cross cut piece of flitch by the edger saws at the edge cut positions determined by the computer system.

* * * * *